Oct. 11, 1960     E. A. HAASE     2,955,538
AFTERBURNER APPARATUS FOR GAS TURBINE ENGINES
Filed May 9, 1951     2 Sheets-Sheet 1

INVENTOR.
ELMER A. HAASE
BY Cecil D. Arens
ATTORNEY

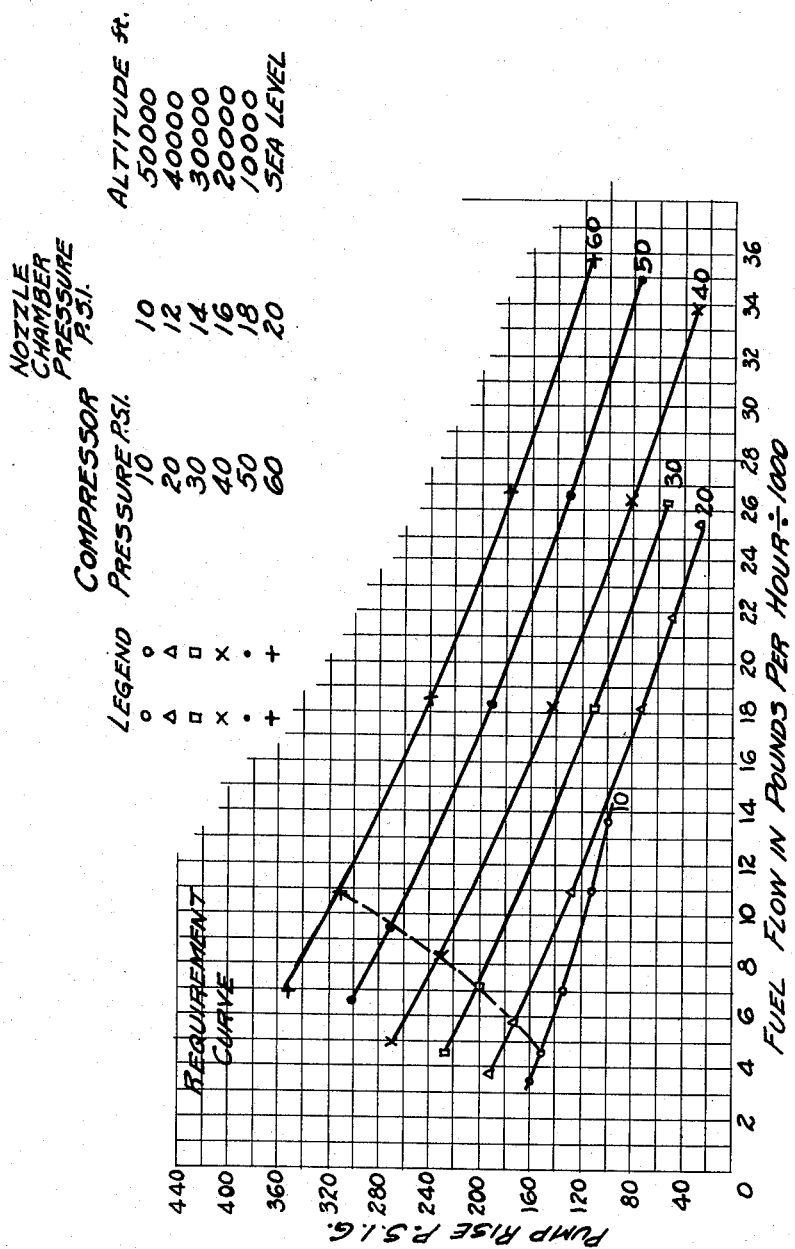

United States Patent Office 2,955,538
Patented Oct. 11, 1960

2,955,538
AFTERBURNER APPARATUS FOR GAS TURBINE ENGINES

Elmer A. Haase, South Bend, Ind., assignor to The Bendix Corporation, a corporation of Delaware Filed May 9, 1951, Ser. No. 225,407
18 Claims. (Cl. 103—12)

This invention concerns fuel supply apparatus for gas turbine engines.

The novel invention herein disclosed is an improvement over the device described and claimed in Patent Number 2,778,312, wherein I am a co-inventor. In the prior application for patent means is provided for limiting fuel pump outlet pressures to a maximum value. In the instant application it is proposed to employ means which actually schedules fuel pump outlet pressures in accordance with variations in compressor discharge pressures.

It is an important object of the invention to provide a fuel pumping apparatus for a gas turbine engine wherein means is provided for maintaining a predetermined pump pressure rise with a specified flow for each compressor discharge pressure.

It is an object of the invention to provide means in a gas turbine engine capable of establishing a relationship between compressor discharge pressure and fuel pump delivery.

Another very important object of the invention resides in the provision of means in a gas turbine engine capable of scheduling pump outlet pressures and flow in accordance with variations in compressor pressures.

A still further object of the invention resides in the employment of means in a gas turbine engine, equipped with an air turbine driven fuel pump, capable of regulating the air input horsepower to the air turbine in accordance with compressor pressures.

The above and other objects and features of the invention will be apparent from the following description of the apparatus taken in connection with the accompanying drawings which form a part of this specification and in which:

Figure 3 is a family of curves showing pump delivery.

Figure 1:
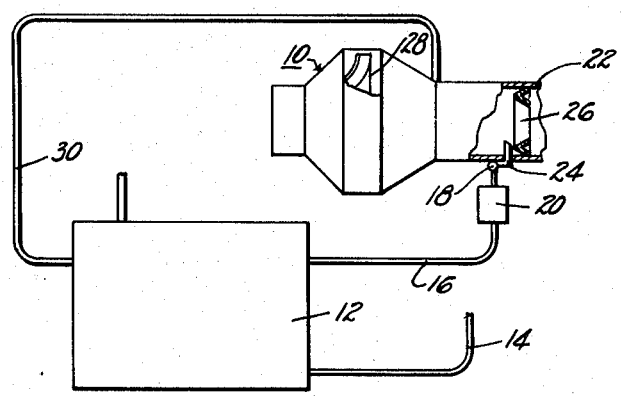
Figure 1 is a schematic representation of the invention shown in association with a jet engine.

Referring now to Figure 1 of the drawings the reference numeral 10 designates a jet engine with which the pump apparatus 12 is associated, for delivering fuel to the afterburner system of the engine. A conduit 14 connects the inlet of the pump apparatus 12 to a fuel supply source, not shown, and a conduit 16 connects the outlet of said apparatus to an afterburner manifold 18, via afterburner fuel metering control equipment 20. The manifold 18, which is located exteriorly of the tail structure 22 and hence not subject to the extremely high temperatures prevailing therein, is equipped with a plurality of discharge nozzles 24, terminating upstream of a flame holder 26, whose function is not necessary to an understanding of this invention and, therefore, needs no further explanation. The pressurizing apparatus 12, which is air driven, is connected to a compressor 28, through a pipe line 30.

Figure 2:
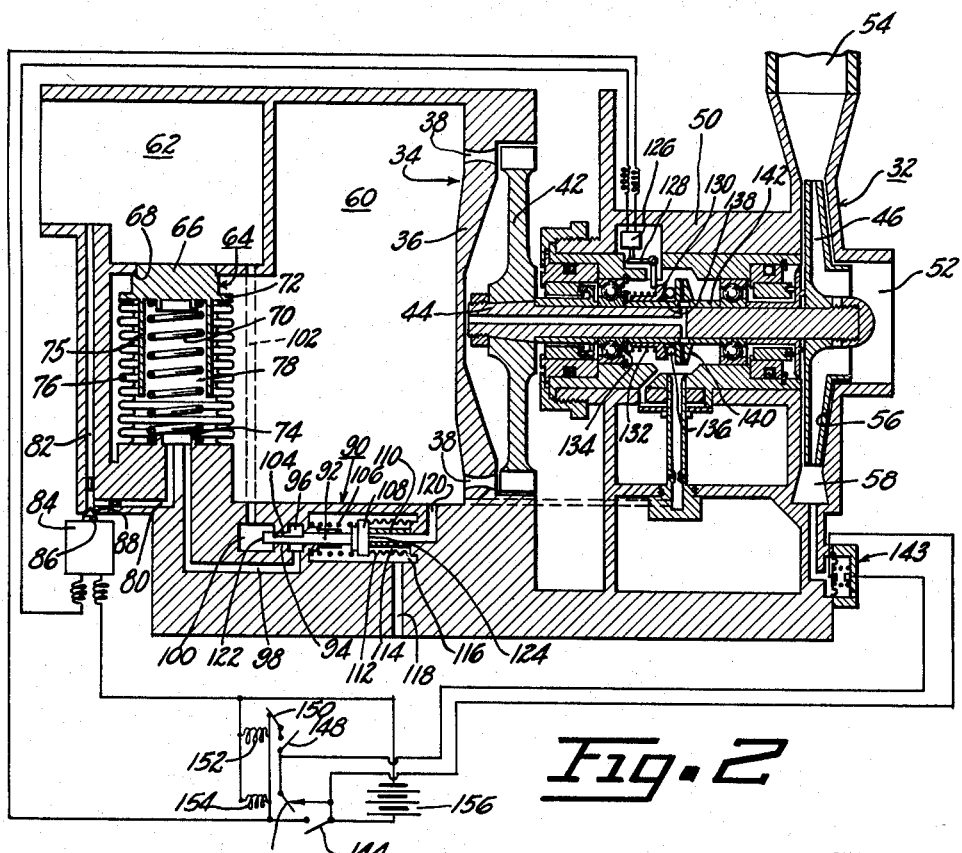
Figure 2 is a schematic showing in section of the apparatus of the invention.

For a detailed description of the pump apparatus 12, refer to Figure 2, wherein the reference numeral 32 designates a centrifugal fuel pump drivably connected to a fluid driven device, the latter being in the form of an air driven turbine 34. The turbine 34 comprises a nozzle plate 36, provided with nozzles 38, properly spaced for directing air onto impeller blades not shown, which are integrally related to the turbine impeller wheel 42, the latter of which is keyed to one end of shaft 44, to the other end of which pump impeller wheel 46 is secured.

The pump impeller 46 and the shaft 44, which are a part of fuel pump 32, are contained in a housing 50 having an inlet opening 52, to which one end of the conduit 14 is connected, and an outlet opening 54, connected to one end of the conduit 16, the other end of said latter conduit being connected to the fuel metering control equipment 20. The inlet and outlet openings 52 and 54 respectively communicate with a chamber 56, in which the pump impeller wheel 46 is rotatably carried. A volute 58 communicates the chamber 56 with the outlet opening 54.

An air inlet connection comprising a nozzle pressure chamber 60 and an air inlet pressure chamber 62 communicate the turbine 34 with the pressure source, that is, compressor pressure, via pipe line 30.

Valve means 64 is inserted in the air connection between the air turbine and the compressor 28 for controlling the air input horsepower to the air turbine. The valve means comprises a poppet valve element 66, which seats at 68 under the action of a spring 70, having one end resting on the housing 50, with the free end of the spring positioned in abutting relationship to said poppet valve element. Projections 72 and 74 on the poppet valve and housing respectively hold the ends of the spring in position. A skirt 75 depends from the underside of the poppet valve 66 for limiting the valve opening and for confining the spring 70 to straight line movement, that is, to prevent buckling of the spring. A bellows 76 has one end attached to the poppet valve element 66 with the other end of the bellows fastened to the housing 50, thus providing a chamber 78 sealed from the chamber 60. Chamber 78 communicates with the inlet pressure chamber 62 via restricted passages 80 and 82. With solenoid valve 84 in closed position, as shown, the pressure in chamber 62 is communicated to the chamber 78. Since the poppet valve 66 has its greater effective area exposed to the chamber 78 the poppet valve is urged upwardly or onto its seat 68 by a force equal to the difference in the effective areas of the two sides of said valve multiplied by the pressure in the chamber 78, plus the force of the spring 70. With the solenoid valve 84 energized, valve member 86 is off seat 88, so that the chamber 78 is connected to atmosphere through the restricted passage 80. The greater pressure in the chamber 62 now unseats the poppet valve, admitting air pressure to the chamber 60.

The inventive concept herein disclosed resides in the provision of a control mechanism or control valve 90 for controlling the air input horsepower to the turbine 34 so that the fuel pump delivery bears a relationship to the air input pressure, that is, compressor pressure, in chamber 62. This control mechanism, which is shown schematically in the housing 50, comprises a valve element or stem 92 slidably positioned in a bore 94, provided with a recess 96 which communicates with the chamber 78 through a passageway 98. One end of the valve element 92 terminates in a cavity 100 having a connection to the inlet air chamber 62 via passage 102. The valve element 92, shown in closed position, has a portion removed at 104 so as to communicate the cavity 100 with the passageway 98 through the bore 94 when the valve element has been moved to the left. A spring 106, interposed between an enlarged head 108 of the valve element and the housing 50, urges said element to the right against one end of a sleeve 110. In this latter position the valve element 92 cuts off communication between the cavity 100 and the passageway 98. A bellows 112 has its free end secured to the enlarged head 108, with the other end of said bellows being suitably attached to the housing 50, to thereby provide a chamber 114 sealed from chamber 116 which communicates with atmosphere through passage 118. The chamber 114 is connected to the chamber 60 by a passageway 120.

With the valve member 86 unseated, and the pump apparatus 12 in operation, the control mechanism 90 is responsive to the pressures upstream and downstream of said valve means 64 for throttling the latter. The areas 122 and 124 at the opposite ends of the valve element 92, and the spring 106, are so related that when the turbine nozzle pressure in chamber 60 exceeds a value which will give a required pump rise at a specified flow, said valve element 92 will be moved to the left, thus communicating the throttling bellows chamber 78 with the compressor pressure in chamber 62. This moves the poppet valve 66 toward its seat 68 to thereby reduce the nozzle chamber pressure and hence the air input horsepower to the turbine 34. With a given compressor pressure in the inlet air chamber 62, it is therefore, a function of the mechanism to hold the pressure in the nozzle chamber constant with a desired pump rise and a specified fuel flow.

In arriving at the valve proportions necessary to obtain a certain relationship between compressor pressure and nozzle chamber pressure, please refer to Figure 3 which shows a family of curves representing fuel flow in lbs. per hour versus pump rise in p.s.i. for compressor pressures ranging from 10 to 60 p.s.i. The fuel requirements for the engine are represented by the dotted line. The first point on the curve to satisfy is the engine fuel requirement at 10 p.s.i. compressor pressure, which is shown on the curve by the symbol (o) to be 4,500 lbs. fuel/hr. at 150 p.s.i. pump rise. An air turbine and pump were then selected which would fulfill this requirement with wide open poppet, no throttling on the air horsepower input to the turbine. Therefore, with 10 p.s.i. compressor pressure and wide open poppet the nozzle chamber pressure is also 10 p.s.i. This compressor pressure corresponds to an altitude of 50,000 ft. At sea level (S.L.) it will be seen that the engine requirements are 11,000 lbs. of fuel per hour with a pump rise of 312 p.s.i., as indicated by the symbol (+) on the curve sheet. The compressor pressure at sea level is 60 p.s.i. Hence with the compressor pressure at 60 p.s.i. that is, the inlet air pressure in chamber 62 at 60 p.s.i., the ratio of the areas 122 and 124 of control 90 is so proportioned that a pump delivery of 11,000 lbs. of fuel per hr. with a pump rise of 312 p.s.i. is obtained. It was found that to meet this requirement of pump delivery the nozzle chamber pressure had to be 20 p.s.i., which means maximum throttling of the poppet valve. Should the nozzle chamber pressure increase beyond this value with the compressor pressure at 60 p.s.i. valve element 92 will shift to the left, thus admitting the pressure in chamber 62 to the throttle bellows chamber 78, to thereby move the poppet valve upwardly, reducing the air horsepower to the turbine 34. Additional points were then selected along the requirement curve, such for example, as the fuel requirements at ten, twenty, thirty, forty, and fifty p.s.i. compressor pressure. It will be understood that the relationships shown in Figure 3 between compressor pressure and nozzle chamber pressure are illustrative only and other relationships may be established by selecting different area ratios between 122 and 124.

The valve means 64 is made responsive to the fuel pump overspeed and to a minimum fuel pump discharge pressure. The overspeed device includes a normally closed switch 126, connected by linkage 128, to an axially shiftable actuator 130, biased to the right by a spring 132, interposed between the actuator and a stop 134, the latter restricting movement of the actuator to the left so that balls 136 are confined between a conical surface 138 of the actuator and a radially disposed flange 140 of sleeve member 142, concentrically positioned with respect to the shaft 44. The spring 132 is of such strength that when the r.p.m. of the pump 32 exceeds a predetermined value the centrifugal force of the balls 136 acting outwardly along the conical surface 138 compresses the spring 132, thus urging the actuator to the left opening the switch 126.

An electrical circuit is provided with the apparatus for controlling the starting and stopping of the pump 32 and comprises the solenoid 84, a minimum discharge pressure switch 143, the overspeed switch 126, a manually controlled, normally open, starting switch 144, a thermal time delay switch 146, a holding switch 148, a manually operated stop switch 150, a holding coil 152, for said holding switch, a heater coil 154, for the time delay switch 146, and a source of current 156. The starting switch 144 is serially connected with the solenoid valve 84 and the overspeed switch 126. The holding coil 150 and heater coil 154 are energized upon closing the starting switch, thus closing the holding switch 148 and subjecting the thermal switch 146 to heat emanating from the coil 154. The holding switch 148 is in parallel with the starting switch 144 and consequently maintains the holding coil energized upon release of the latter switch. The thermal time delay switch 146 is in series with the holding switch 148, and the former is set to break the holding circuit in a predetermined time after closing the starting switch. Attention is called to the fact that the minimum discharge pressure switch 143 shunts the thermal switch 146, and if the former switch is closed, as a result of the pressure in volute 58, opening the latter switch has no effect on the holding circuit. However, if the pressure in volute 58 is below a predetermined value at the time the thermal switch 146 opens, the holding circuit will remain deenergized since the switch 143 will not have been closed, and it will be necessary to again close the starting switch to start the afterburner apparatus.

Operation of the afterburner apparatus is as follows:
If we assume a condition wherein the apparatus is not running, the starting switch 144 will be open, and the other parts of the apparatus will be as shown in Figure 2, for example, the poppet valve 66 will be closed, the solenoid valve 84 will be deenergized, and the holding switch 148 will be open as well as the pressure switch 142.

To put the afterburner system into operation the starting switch 144 is closed. This energizes the solenoid 84, which unseats the valve element 86 from the seat 88, thus communicating chamber 78 to atmosphere through the restricted passage 80. This release of pressure from the throttling bellows chamber 78 allows the poppet 66 to be opened under the influence of the inlet air pressure in chamber 62. The pressure in the nozzle chamber 60 rises until the pump delivery is that required for the existing inlet pressure in the chamber 62, at which time, any further rise in pressure will bring the control mechanism 90 into operation, thus throttling the poppet valve to maintain a definite relationship between compressor pressure and fuel pump delivery.

Having thus described the various features of the invention, what I claim as new and desire to secure by Letters Patent is:

I claim:

1. For use in the fuel system of a gas turbine engine having an air pressure supply, fuel pressurizing apparatus comprising a pump, an air actuated device equipped with an inlet and connected to the pump for driving the same, a connection between said air pressure supply and the inlet of the device, and means for controlling air passing through the connection to the device including a mechanism responsive to and operable as a function of variations in the air pressure supply and the inlet pressure of said device.

2. For use in the fuel system of a gas turbine engine having a fluid pressure supply, fuel pressurizing apparatus comprising a pump drivably connected to a fluid driven device, the latter of which is provided with an inlet, a connection communicating the inlet of said fluid driven device to the fluid pressure supply, valve means in the connection, and a control mechanism for the valve means which is responsively connected to the pressures upstream and downstream of the latter.

3. For use in the fuel system of a gas turbine engine having a fluid pressure supply, fuel pressurizing apparatus comprising a pump drivably connected to a fluid driven device, a connection communicating the inlet of said fluid driven device to the fluid pressure supply, valve means in the connection, and a mechanism communicating with the upstream and downstream sides of said valve means for controlling the latter and including means which establishes a relationship between pump delivery and the pressure upstream of said valve means.

4. In combination with a gas turbine engine provided with a compressor, a fuel system comprising a pump, an air driven turbine connected to the pump, a conduit connecting the compressor discharge to the air turbine inlet, and means including a device in the conduit for controlling air and responsive to compressor discharge pressure and turbine inlet pressure for maintaining a relationship between pump delivery and compressor discharge pressure.

5. In combination with a gas turbine engine provided with a compressor, a fuel system comprising a pump, an air driven turbine connected to the pump, a conduit connecting the compressor discharge to the air turbine inlet, and means for maintaining a relationship between compressor discharge pressure and pump delivery including an air control device in the conduit, said means embracing a mechanism responsive to compressor discharge pressure and air turbine inlet pressure.

6. In combination with a gas turbine engine provided with a compressor, a fuel system comprising a pump, an air driven turbine connected to the pump, a connection between the compressor discharge and the inlet side of the air turbine, and means for maintaining a relationship between compressor discharge pressure and pump delivery including an air control device in the connection, said means embracing a control valve subjected to compressor discharge pressure and air turbine inlet pressure.

7. In combination with a gas turbine engine provided with a compressor, a fuel system comprising a pump, an air driven turbine connected to the pump, means for controlling the admission of air from the compressor to the air driven turbine comprising a valve, and a control valve for the first named valve actuable by the compressor discharge pressure or the air turbine inlet pressure, said control valve having areas with a definite ratio on which said compressor pressure and air turbine inlet pressure respectively act to establish a relationship between compressor discharge pressure and pump outlet pressure and flow.

8. In combination with a gas turbine engine equipped with a compressor, a fuel system comprising a pump, an air turbine drivably connected to the pump and having an inlet opening, a connection between the inlet opening of the air turbine and the compressor, a poppet valve in the connection, a spring urging said poppet valve towards closed position, said valve being subjected to compressor pressure on one side tending to open said valve, a passage connecting opposite sides of said valve, a restricted passageway connecting the other side of said poppet valve to atmosphere, said other side of the poppet valve having the greater effective area, and a control valve in the passage subject to compressor pressure tending to close the passage and to air turbine inlet pressure tending to open said passage to communicate said other side of the poppet valve to compressor pressure.

9. The combination in claim 8 wherein means is provided for controlling said restricted passageway.

10. The combination with a gas turbine engine having a compressor, of a fuel system therefor comprising a fuel pump, an air powered device drivably connected to the pump and provided with an inlet, a connection from said inlet to the compressor, a valve in the connection, and a control mechanism for the valve including another valve subject to compressor pressure tending to urge the latter valve in one direction and to the inlet air pressure of the device tending to urge said latter valve in the opposite direction.

11. The combination with claim 10 wherein electrical means is provided for controlling the starting and stopping of said air powered device.

12. Control apparatus for the fuel system of a gas turbine engine comprising a fuel pump, an air powered device drivably connected to the pump, a connection for the passage of air to said device which is adapted to be connected to an air pressure source, a valve in the connection between said source and device, and a control mechanism for the valve responsive to air pressures anterior and posterior to said valve and communicating with the connection at points therein anterior and posterior to said valve for regulating the air input horsepower to said device.

13. An apparatus of the type defined in claim 12 wherein means is provided for stopping said pump should fuel outlet pressure be reduced below a predetermined value.

14. In combination, a pump for putting fluid under pressure, a source of pressure fluid, a fluid driven device drivably associated with the pump, a connection communicating said fluid driven device with said pressure fluid source, valve means in the connection, and separate valvular control means operatively connected to said valve means for controlling said valve means, said valvular control means having a connection with and being responsive to said pressure fluid source for controlling said valve means as a function of the pressure at said source.

15. In combination, a pump for putting fluid under pressure, a source of pressure fluid, a fluid driven device drivably associated with the pump, a connection communicating said fluid driven device with said pressure fluid source, valve means in the connection, and control means including a contoured valve member operatively connected to said valve means, said control means having a connection with and being responsive to said pressure fluid source for controlling said valve means as a function of the level of fluid pressure at said source.

16. In combination, a pump for delivering fluid under pressure, a source of pressure fluid, a fluid driven device drivably associated with the pump, a connection communicating said fluid driven device with said pressure fluid source, valve means in the connection, and control mechanism having a fluid connection with said source of pressure fluid, said control mechanism including means responsive to and operable as a function of the fluid pressure at said source, for establishing a relationship between the delivery pressure of said pump and the fluid pressure at said source.

17. In combination with a gas turbine engine provided with a compressor, a fuel system comprising a pump, an air driven turbine connected to the pump, a conduit connecting a source of compressor generated pressure to the air turbine inlet, valve means in the conduit for controlling air flow to the air turbine inlet, and separate control means operatively connected to said valve means, including a member responsive to said compressor generated pressure, for establishing a relationship between pump discharge pressure and said compressor generated pressure.

18. In combination, a pump for producing specified flow values under pressure, a fluid driven device drivably associated with the pump, a fluid connection between said fluid driven device and a source of fluid under pressure, and control means between said source of fluid and said fluid driven device for controlling the flow of fluid to said fluid driven device, said control means provided with a fluid connection to said source of pressure and being actuable as a function of said last mentioned pressure to maintain the pump pressure rise at a different prescribed value for each specified flow value.

References Cited in the file of this patent

UNITED STATES PATENTS

| | | |
|---|---|---|
| 1,415,647 | Huff | May 9, 1922 |
| 2,546,415 | Alcock | Mar. 27, 1951 |
| 2,550,678 | Deacon | May 1, 1951 |
| 2,612,020 | Griffith | Sept. 30, 1952 |